United States Patent Office 2,732,377
Patented Jan. 24, 1956

2,732,377

STABILIZATION OF POLYMERIZABLE HETEROCYCLIC NITROGEN COMPOUNDS

John E. Mahan and Mack F. Potts, Bartlesville, Okla., assignors to Phillips Petroleum Company, a corporation of Delaware No Drawing. Application November 28, 1952, Serial No. 323,136

12 Claims. (Cl. 260—290)

This invention relates to the stabilization of polymerizable compounds. In one of its aspects this invention relates to the stabilization of polymerizable heterocyclic nitrogen compounds under storage and handling conditions, and during distillation, or at elevated temperatures. In another of its more specific aspects, this invention relates to a method for preventing loss of heterocyclic nitrogen compounds due to polymerization.

It is well known that unsaturated, polymerizable heterocyclic nitrogen compounds tend to polymerize during storage and various handling conditions, especially during distillation, and consequently yield and recovery of these compounds are oftentimes considerably diminished due to this unwanted and undesirable polymerization. Also, besides reducing yields and recovery of these polymerizable heterocyclic nitrogen compounds, often the polymerized material adversely affects the reaction wherein these polymerizable compounds are employed as reactants, as well as the products which are derived from these reactions.

Each of the objects of this invention will be obtained by at least one of the aspects of this invention.

It is an object of this invention to prevent and/or inhibit the polymerization of polymerizable heterocyclic nitrogen compounds during storage and other handling situations. It is another object of this invention to inhibit the polymerization of these materials at elevated temperatures and especially during distillation. It is another object of this invention to provide polymerization inhibited compositions comprising a polymerizable heterocyclic nitrogen compound. Yet another object of this invention is to provide a polymerization inhibited composition comprising a vinyl-substituted pyridine.

Other and further objects and advantages of this invention will be apparent to those skilled in the art upon study of the accompanying disclosure.

We have found that certain iron halides are effective as polymerization inhibitors for these polymerizable heterocyclic nitrogen compounds. Suitable are the ferrous and ferric chlorides, bromides, and iodides.

These iron halides are effective as polymerization inhibitors over a wide range of temperatures from below and about 40° F. up to and about 400° F. The amount of the stabilizing agent which need be added to inhibit polymerization varies with the amount and type of polymerizable hetrocyclic nitrogen compound to be inhibited. Often a trace of the iron halide is sufficient to prevent undesired polymerization. We usually use an amount in the range of 0.001 to 5.0% by weight, preferably from 0.05 to 1.0% by weight, based on the amount of the polymerizable heterocyclic nitrogen compound. Larger amounts, even as much as 10% by weight and higher can be used if desired, although under most circumstances this is not necessary. These stabilizing agents are effective in anhydrous systems as well as in systems where water is present.

These iron halides, in order to be especially effective, should preferably be in intimate contact with the material to be stabilized. As these iron halides are, in general, only slightly soluble in the polymerizable heterocyclic nitrogen compounds, they are generally added as fine powders after which the mixture is stirred and/or warmed. The stabilizing agent may be added batchwise or continuously as the heterocyclic nitrogen compound is produced.

The recovery of the iron halides from the polymerizable heterocyclic nitrogen compounds with which it is admixed is relatively simple and easily effected. After storage, handling, or shipment of the stabilized material, the stabilizing agent can be easily and readily separated and recovered either by distillation, preferably under reduced pressure, or by any other convenient method.

The polymerizable heterocyclic nitrogen compounds which can be inhibited against polymerization by these iron halides in accordance with this invention include the polymerizable heterocyclic nitrogen compounds of the pyridine and quinoline (including isoquinoline) series and the nuclear (ring) alkyl-substituted derivatives thereof. These polymerizable heterocyclic nitrogen compounds are those containing a

group where R is a hydrogen atom or a methyl group. One or two vinyl groups may be present, and also alkyl groups may be present attached to the ring as long as there are not more than 12 carbon atoms in these alkyl groups. Typical heterocyclic nitrogen compounds which are applicable in the practice of this invention include the vinyl-substituted pyridines and the vinyl-substituted quinolines such as 2-vinylpyridine, 5-methyl-2-vinylpyridine, 5-ethyl-2-vinylpyridine, 2-methyl-5-vinylpyridine, 2,5-divinylpyridine, 3-methyl-2,5-divinylpyridine, 4-methyl-3-vinylpyridine, 2-isopropenylpyridine, 5-propyl-2-isopropenylpyridine, 2-octyl-5-vinylpyridine, 2-vinylquinoline, 8-ethyl-2-vinylquinoline, 2-hexyl-5-vinylquinoline, 1-vinylisoquinoline, 5-methyl-1-isopropenylisoquinoline, 1,8-divinylisoquinoline, 2,5-divinylquinoline, 6,7-dimethyl-2,5-divinylquinoline, etc. Generally, as indicated, any polymerizable nitrogen compound such as the vinyl substituted pyridines, quinolines or isoquinolines are applicable in the practice of this invention. Other polymerizable heterocyclic nitrogen compounds which can be stabilized following the teaching of this invention include the

substituted (R as defined above) piperidines (hexahydropyridines), pyrroles, pyrrolidines, especially the vinyl-substituted piperidines, pyrroles, pyrrolidines, the dihydro- and the tetrahydropyridines, and their alkyl derivatives. Other materials such as N-vinylpyrrolidone and 9-vinylcarbazole (N-vinyl) can be used in the practice of this invention.

The following specific examples set forth hereinafter are illustrative of this invention and specific details for operating the present invention are described with comparative results showing the improvement obtained by this invention. However, as indicated, these examples are merely illustrative and not limitative of this invention.

Example

Runs were made using ferric chloride, ferrous chloride, and ferrous bromide as polymerization inhibitors for 2-methyl-5-vinylpyridine. In one series of tests the vinylpyridine was substantially anhydrous and in the other 5 weight per cent of water was present. In each run 0.3 per cent by weight of the compound being tested was added to 2-methyl-5-vinylpyridine and the mixture was heated in an atmosphere of nitrogen for 24 hours at 185° F. The unreacted 2-methyl-5-vinyl-pyridine was removed by vacuum distillation at a pressure less than 1 mm. Hg. The polymer which remained was weighed and the per cent 2-methyl-5-vinylpyridine polymerized was calculated. For comparative purposes a run was made in which no additive was present. The following results were obtained:

| Additive | Percent 2-Methyl-5-vinylpyridine Polymerized | |
|---|---|---|
| | No Water | 5 Percent Water |
| Ferric chloride | 2.94 | 3.42 |
| Ferrous chloride | 5.10 | 5.97 |
| Ferrous bromide | 4.19 | 5.03 |
| None | 23.0 | |

A run was made using ferric fluoride as a polymerization inhibitor for 2-methyl-5-vinylpyridine using 0.3 weight per cent of the additive and heating the mixture in an atmosphere of nitrogen for 24 hours at 200° F. Ferric fluoride is ineffective as evidenced by the fact that the sample became very viscous and was similar in appearance to a run in which 2-methyl-5-vinyl-pyridine was heated under similar conditions in the absence of an additive.

As many possible embodiments may be made of this invention without departing from the scope thereof, it is to be understood that all matter herein set forth is to be interpreted as illustrative and not in a limiting sense.

We claim:

1. A polymerizable heterocyclic nitrogen base selected from the group consisting of compounds having the formula

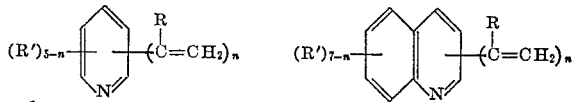

and

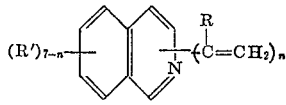

where $n$ is an integer selected from the group consisting of 1 and 2, R is selected from the group consisting of H and CH₃, and R' is selected from the group consisting of H and alkyl groups, not more than 12 carbon atoms being present in the total of said R' groups, said heterocyclic nitrogen base being stabilized by the addition of a stabilizing amount of an iron halide selected from the group consisting of chlorides, bromides, and iodides.

2. A polymerizable heterocyclic nitrogen base selected from the group consisting of compounds having the formula

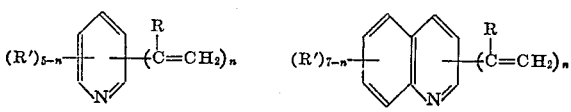

and

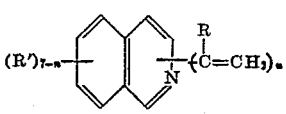

where $n$ is an integer selected from the group consisting of 1 and 2, R is selected from the group consisting of H and CH₃, and R' is selected from the group consisting of H and alkyl groups, not more than 12 carbon atoms being present in the total of said R' groups, said heterocyclic nitrogen base being stabilized by the addition of from 0.001 to 5.0 per cent by weight of an iron halide selected from the group consisting of chlorides, bromides, and iodides.

3. 2-methyl-5-vinylpyridine stabilized by the addition of a stabilizing amount of an iron halide selected from the group consisting of chlorides, bromides, and iodides.

4. 2-methyl-5-vinylpyridine stabilized by the addition of from 0.001 to 5.0 per cent by weight of an iron halide selected from the group consisting of chlorides, bromides, and iodides.

5. 2-methyl-5-vinylpyridine stabilized by the addition of 0.001 to 5.0 per cent by weight of ferrous chloride.

6. 2-methyl-5-vinylpyridine stabilized by the addition of 0.01 to 5.0 per cent by weight of ferric chloride.

7. 2-methyl-5-vinylpyridine stabilized by the addition of 0.001 to 5.0 per cent by weight of ferrous bromide.

8. 2-vinylpyridine stabilized by the addition of a stabilizing amount of an iron halide selected from the group consisting of chlorides, bromides, and iodides.

9. 2-vinylpyridine stabilized by the addition of from 0.001 to 5.0 per cent by weight of an iron halide selected from the group consisting of chlorides, bromides, and iodides.

10. A process for inhibiting the polymerization of a compound selected from the group consisting of compounds having the formula

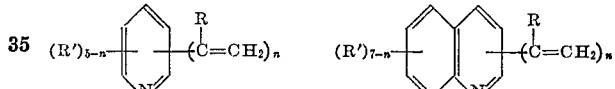

and

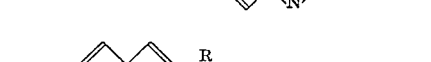

where $n$ is an integer selected from the group consisting of 1 and 2, R is selected from the group consisting of H and CH₃, and R' is selected from the group consisting of H and alkyl groups, not more than 12 carbon atoms being present in the total of said R' groups, which comprises adding to said compound a polymerization inhibiting amount of an iron halide selected from the group consisting of chlorides, bromides, and iodides.

11. A process for inhibiting the polymerization of 2-methyl-5-vinylpyridine which comprises adding to said 2-methyl-5-vinylpyridine from 0.001 to 5 per cent by weight of an iron halide selected from the group consisting of chlorides, bromides, and iodides.

12. A process for inhibiting the polymerization of 2-vinylpyridine which comprises adding to said 2-vinylpyridine from 0.001 to 5 per cent by weight of an iron halide selected from the group consisting of chlorides, bromides, and iodides.

References Cited in the file of this patent

UNITED STATES PATENTS

| 2,512,660 | Mahan | June 27, 1950 |
| 2,556,845 | Kauffman | June 12, 1951 |
| 2,592,625 | Wagner | Apr. 15, 1952 |

OTHER REFERENCES

Chem. Abstracts, vol. 31, col. 5376 (1937).
Chem. Abstracts, vol. 40, col. 1778 (1946).
Chem. Abstracts, vol. 41, col. 1710 (1947).